United States Patent [19]

Peters et al.

[11] 4,188,144
[45] Feb. 12, 1980

[54] MECHANISM FOR HOLDING AND GUIDING A PIVOTING MEMBER

[75] Inventors: Klaus-Jürgen Peters, Affalterbach; Hermann Nusser, Asperg; Manfred Knetsch, Stuttgart, all of Fed. Rep. of Germany

[73] Assignee: Robert Bosch GmbH, Stuttgart, Fed. Rep. of Germany

[21] Appl. No.: 816,841

[22] Filed: Jul. 18, 1977

[30] Foreign Application Priority Data

Aug. 20, 1976 [DE] Fed. Rep. of Germany ....... 2637467

[51] Int. Cl.² .......................... F16B 7/10; F16D 1/12
[52] U.S. Cl. .................................... 403/104; 403/113; 137/499
[58] Field of Search ................ 123/139 AW, 139 BG, 123/119 R, 139 AT; 261/44 A, 44 F; 137/499; 403/113, 116, 104, 166

[56] References Cited

U.S. PATENT DOCUMENTS

| | | | |
|---|---|---|---|
| 1,806,922 | 11/1926 | Chandler | 261/44 F |
| 2,806,723 | 9/1957 | Fairclough | 403/104 |
| 2,947,556 | 8/1960 | Wenger | 403/104 |
| 3,182,673 | 5/1965 | Small | 403/104 |
| 3,688,754 | 9/1972 | Eckert | 123/119 R |
| 3,843,271 | 10/1974 | Bjerknes | 403/104 |
| 3,880,125 | 4/1975 | Kommerer et al. | 123/119 R |
| 4,034,029 | 7/1977 | Tipton | 261/44 F |
| 4,112,900 | 9/1978 | Schwartz et al. | 123/139 AW |

FOREIGN PATENT DOCUMENTS

| | | | |
|---|---|---|---|
| 1281747 | 10/1968 | Fed. Rep. of Germany | 123/119 R |
| 2557968 | 6/1977 | Fed. Rep. of Germany | 123/139 AW |
| 1200041 | 7/1970 | United Kingdom | 123/139 BG |

*Primary Examiner*—Martin P. Schwadron
*Assistant Examiner*—A. Michael Chambers
*Attorney, Agent, or Firm*—Edwin E. Greigg

[57] ABSTRACT

A pivoting member, especially the air flow rate meter of an internal combustion engine is disposed on a hub which surrounds a locally fixed shaft. Extending inwardly from the hub is a protrusion, for example a pin, which penetrates an opening in the wall of the shaft which is hollow at this point due to a blind bore extending axially into the shaft. The protrusion is held between two balls or rollers which are located in the blind bore and held in position by cooperation of a spring and an adjustment screw. The adjustment screw has a counter nut which bears on the end face of the shaft and also has gear teeth which engage a first set of threads of a pinion. The pinion has another set of threads of opposite and slightly different pitch so that rotation of the pinion causes differential rotation of the counter nut and permits very precise axial positioning of the hub which carries the pivoting member.

9 Claims, 6 Drawing Figures

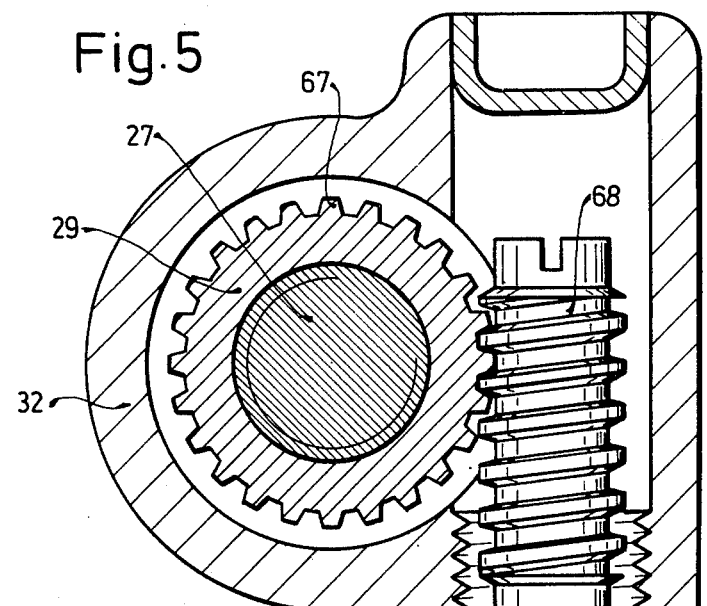
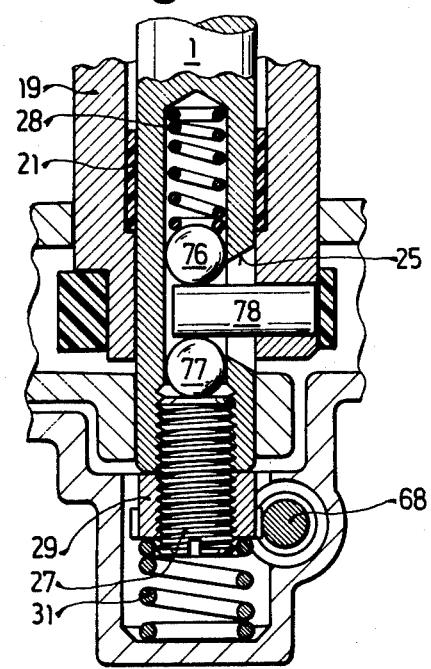
Fig. 5
Fig. 6

MECHANISM FOR HOLDING AND GUIDING A PIVOTING MEMBER

BACKGROUND OF THE INVENTION

The invention relates to a mechanism for the pivoting and axial alignment of a pivotable element. More particularly the invention relates to the axial alignment and pivoting of the air flow rate element disposed in the induction tube of an internal combustion engine. Known in the art is a variety of mechanisms for axial alignment of a pivoting element. The known mechanisms are relatively expensive and unsatisfactory in operation.

OBJECT AND SUMMARY OF THE INVENTION

It is therefore a principal object of the invention to provide a guidance and alignment mechanism for a pivoting element, in particular the pivoting air flow rate meter of an internal combustion engine. It is a further object of the invention to provide a pivoting and alignment mechanism for radial and axial guidance and alignment of a pivotal element with only reduced amounts of friction and capable of construction by the use of relatively inexpensive mass-produced parts. Yet another object of the invention is to provide a guidance and alignment mechanism permitting the easy adjustment of the axial position of the pivoting element.

Yet another object of the invention is to provide a mechanism in which all the axial play is taken up and which is capable of easy installation. A further object of the invention is to provide a mechanism in which the alignment is performed with commercial parts such as balls and rollers.

It is a further object of the invention to provide for the relative adjustment of the pivotal element and its pivotal shaft with a high degree of precision.

These and other objects are attained according to the invention by providing a shaft and disposed thereon a pivotal element. The shaft has an axial blind bore containing two alignment elements which straddle an alignment pin associated with the pivotal element. The axial position of the alignment elements may be changed by means of an adjustment screw opposed by a spring. The relative positioning of the pivotal element and its pivotal shaft is performed by a screw having two opposing threads of slightly different pitch whereby rotation of the screw causes an axial displacement equal only to the difference of the two pitches.

The invention will be better understood as well as further objects and advantages thereof become more apparent from the ensuing detailed description of a preferred embodiment taken in conjunction with the drawing.

BRIEF DESCRIPTION OF THE DRAWING

FIG. 5 is a section along the line V—V in FIG. 2; and

FIG. 6 is a detail of a second variant of an axial alignment mechanism according to the invention.

DESCRIPTION OF THE PREFERRED EMBODIMENT

Figure 1:
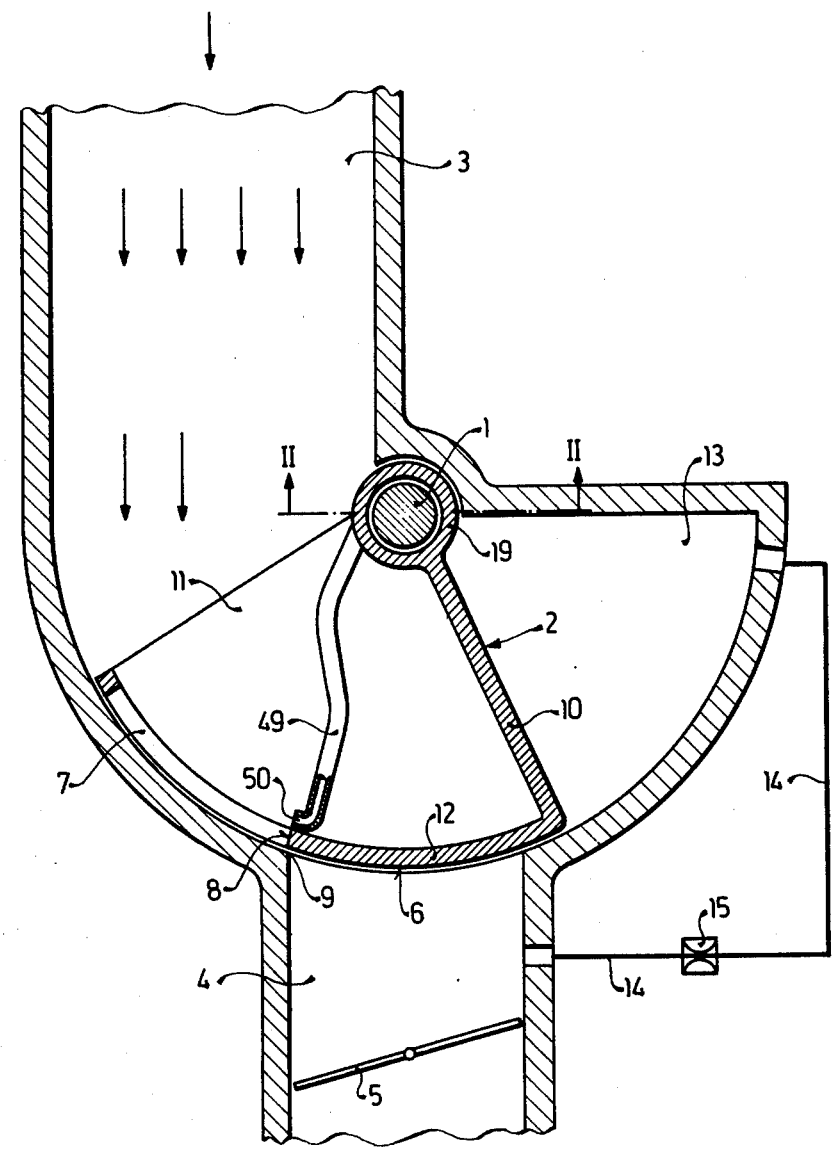
FIG. 1 is a section along the line I—I of FIG. 2 of an induction tube and the pivotal air flow rate meter contained therein.

Turning now to FIG. 1, there will be seen a cross section of a portion of an induction tube of an internal combustion engine containing a pivotal shaft 1 and mounted thereon a pivotal element 2, for example an air flow rate meter for sensing the air flow through the induction tube and responding thereto by an appropriate pivotal motion about the shaft 1. In operation, the air required for combustion flows through the induction tube in the direction of the arrows through a region 3 of the induction tube containing the air flow rate meter 2 and continues through an induction tube region 4 containing an arbitrarily settable throttle valve 5 to one or several cylinders (not shown) of an internal combustion engine. The air flow rate meter 2 pivots about a fixed shaft 1 mounted transversely in the induction tube. The air flow rate meter is a pivoting body in the shape of a cylindrical sector having an opening 7 in the curved end face 6 remote from the pivotal shaft 1. As the air flow increases and the pivotal element 2 rotates in a counterclockwise direction, the relative overlap of the opening 7 and the induction tube region 4 provides a flow cross section of variable size defined between the edge 8 of the opening 7 of the pivotal element on the one hand and the corner 9 of the induction tube. The pivotal element 2 is open in the direction of air flow and contains a cavity defined by a radial wall 10 transverse with respect to the air flow and side walls 11 aligned with the air flow. The pivotal element is further defined by a curved cylindrical wall 12 with the previously mentioned surface 6. The pivotal element 2 moves in the induction tube region 3 with very tight radial play, preventing any substantial air flow between the walls of the pivotal element and the induction tube. During opening motions of the air flow meter 2, the transverse wall 10 enters a damping chamber 13 which communicates through a line 14 and a damping throttle 15 with the induction tube region 4 downstream of the air flow meter 2. As a consequence, induction tube pressure oscillations due to piston suction strokes do not have any practical influence on the angular position of the air flow meter 2. The rotary motion of the air flow meter 2 in the induction tube region 3 is a linear function of the air flow rate. If the air pressure upstream of the flow meter 2 remains constant, then the air pressure between the flow meter 2 and the throttle valve 5 also remains constant.

Figure 2:
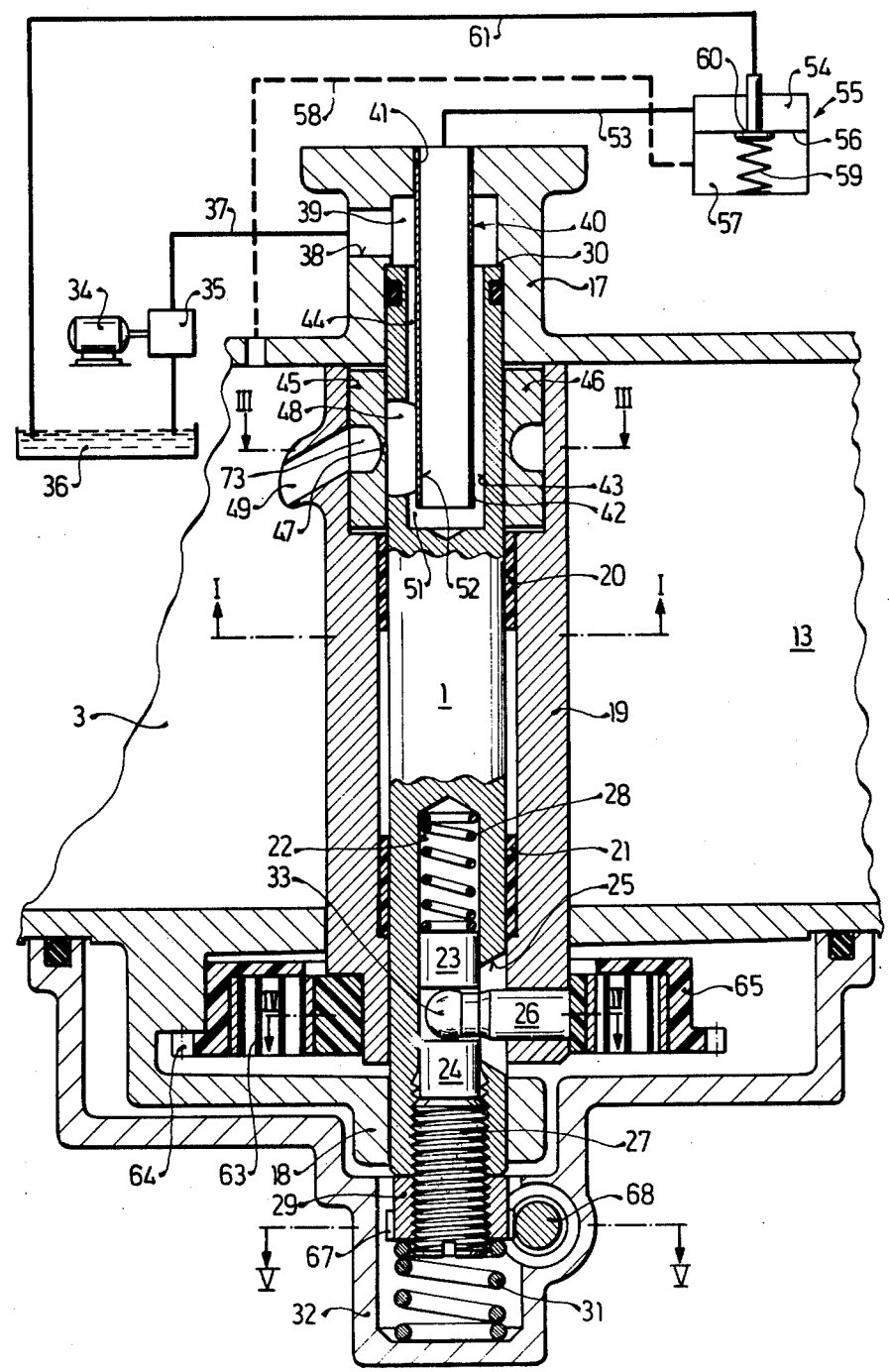
FIG. 2 is a section along the line II—II in FIG. 1 of an air flow meter and its supporting shaft as well as the axial alignment mechanism according to the invention.

FIG. 2 illustrates in detail how the shaft 1 is mounted within the induction tube and the manner in which the air flow meter 2 is mounted on the shaft 1. As illustrated there, the shaft 1 is carried snugly in two bearings 17, 18 capable of rotation therein. Surrounding the shaft 1 coaxially is a hub 19 on which is mounted the air flow meter 2. The hub 19 is carried on the shaft 1 over preferably Teflon-coated sleeve bearings 20, 21. The axial orientation of the hub 19 and the pivotal member 2 mounted thereon is insured by a pin 26 pressed fixedly in the hub 19 and passing through a recess 25 in the shaft into an axial blind bore 22 in the pivotal shaft 1. The blind bore 22 further contains two guide elements 23, 24 located on axially opposite sides of the guide pin 26. The recess 25 in the shaft 1 is of sufficient size to permit a rotation of the hub with respect to the shaft by approximately 60°. The relative axial position of the guide elements 23, 24 and hence of the guide pin 26 held thereby is insured by an adjustment screw 27 moving in screw threads in the shaft 1 and bearing against one of the guide elements 24 while the second guide element 23 is urged in the opposite direction by a spring 28 supported in the blind end of the bore 22 and urging the guide element 23 against the guide pin 26. The presence of the compression spring 28 insures that the axial play is taken up and that stresses due to axial oscillations are avoided. The guide elements 23 may be, as shown in FIG. 2, cylindrical rollers in which case the part 33 of the guide pin in contact with the guide elements 23 and 24 may be spherical.

A counter nut 29 threaded on the adjustment screw 27 fixes the relative position of the screw with respect to the shaft 1. The position of the shaft 1 within its own bearings is fixed by a spring 31 which forces the counter nut 29 against a shoulder 30 of the shaft bearing 17. A cover 32 provides support for the opposite end of the spring 31. As is illustrated in FIG. 2, the air flow meter 2 may be the air flow measuring part of a fuel injection system and serve for the direct actuation of a fuel metering valve. In that case, as shown by way of example in FIG. 2, an electric motor 34 drives a fuel pump 35 which aspirates fuel from a fuel tank 36 and feeds it through a line 37 and an opening 38 in the bearing 17 to an annular groove 39 within the bearing 17. The inside diameter of the annular groove 39 is defined by a tube 40 whose end 41 is pressed into the bearing 17 and whose opposite end 42 extends concentrically into an axial bore 43 within the shaft 1. The axial bore 43 is on the same center line but at the opposite end of the shaft from the blind bore 22. The diameter of the axial bore 43 is larger than that of the tube 40 so that there is formed an annular gap 44 through which fuel may flow from the groove 39 between the tube 40 and the wall of the bore 43. Fuel metering is performed by providing within a central interior bore 45 of the hub 19 a short slotted bushing 46 the inside diameter of which is penetrated by a control slot 47 which overlaps a connecting slot 48 in the shaft 1 to varying degrees (see also FIG. 3). Accordingly, the fuel metered at the control slot 47 flows through a fuel line 49 which may terminate near the edge 8 of the air flow element 2 in the vicinity of the aperture 7, and may be provided with an injection nozzle 50 for injecting fuel into the induction tube at the orifice defined by the control edge 8. Fuel injection could also take place through several injection nozzles or an injection slit. Any remaining fuel flowing through the annular slit 44 flows out of the annular opening 51 defined between the end of the axial bore 43 and the end of the tube 40 and continues through the interior of the tube 40, i.e., past the wall 52, whence it travels through a line 53 to the first chamber 54 of a pressure control valve 55. This pressure valve 55 maintains a constant pressure drop across the control slot 47. For this purpose, a diaphragm 56 defines a first chamber 54 and a second chamber 57 which communicates through an air line shown in dashed lines with the induction tube region 3 upstream of the air flow meter 2. Accordingly, the chamber 57 experiences the same pressure as prevails downstream of the control slot 47. The chamber 57 further contains a spring 59 which urges the diaphragm 56 to close against the terminus of a fuel return line 61 providing a valve seat 60. The force of the spring 59 could be changed in dependence on operational characteristics of the engine, for example by a solenoid, not shown. Additional forces could be applied in dependence on operational variables in parallel with the spring 51 to act directly on the diaphragm 56. The fuel flow scheme described above offers the significant advantage that the entire fuel quantity flows through the region of fuel metering and thus immediately flushes away any gas bubbles formed there. The pivotal motion of the air meter 2 is opposed by a spiral spring 63 one end of which is affixed to the hub 19 while the other end is coupled to a ring 65 provided with gear teeth 64. A pinion, not shown, can rotate the geared ring 65 and set screws, not shown, can be used to fix it in a given position.

Provision is further made for a basic adjustment of the fuel quantity metered out through the control slot 47 by adjustment of the relative position of the shaft 1 and the air flow meter 2. For this purpose, as is best seen in FIG. 5, the counter nut 29 is provided with gear teeth which engage a worm gear 68. As also shown in FIG. 5, the worm gear is disposed on a screw which also has screw threads in the opposite sense of the worm 68 with slightly higher pitch than those of the latter. Thus, during a rotation of the screw, only the difference of the pitches of the worm and the screw are effective in turning the counter nut 29, thereby providing a very sensitive method of adjusting the position thereof.

Figure 3:
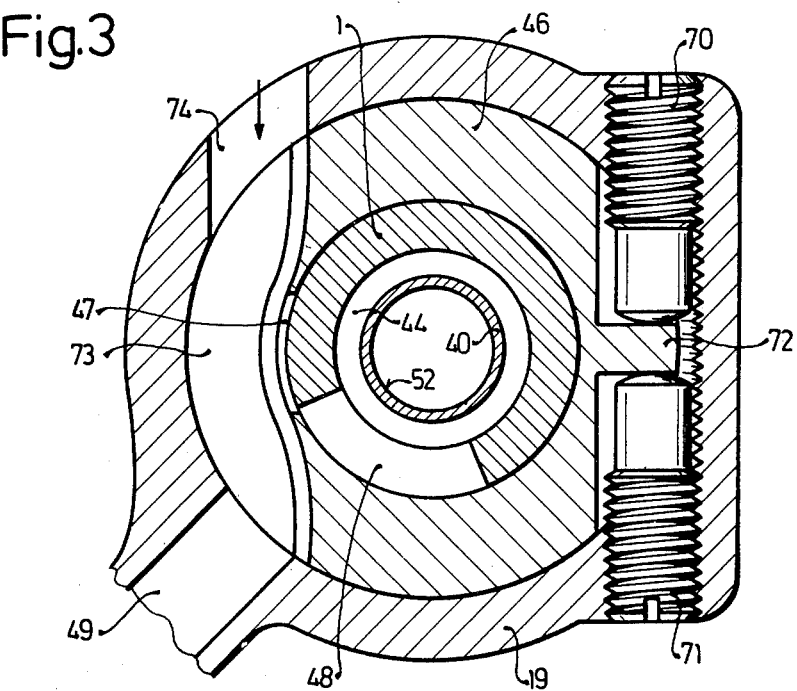
FIG. 3 is a section along the line III—III of FIG. 2.

As illustrated in detail in FIG. 3, the pivotal motions of the air flow meter 2 are transmitted to the slotted bushing 46 by means of two screws 70, 71 which engage opposite faces of a protrusion 72 of the slotted bushing 46 and thus permit an adjustment of the relative position of the two parts. It has been shown to be advantageous to provide additional air prior to injection to the fuel metered out as between the control slot 47 and the connecting slot 48. For this purpose, there is provided an air hole 74 in the bushing 19 communicating with the induction tube region 3 upstream of the air flow meter 2 and also communicating through a groove 73 in the slotted bushing 46 with the control slot 47. The addition of air to the metered out fuel prior to injection results in an improved mixture preparation.

Figure 4:
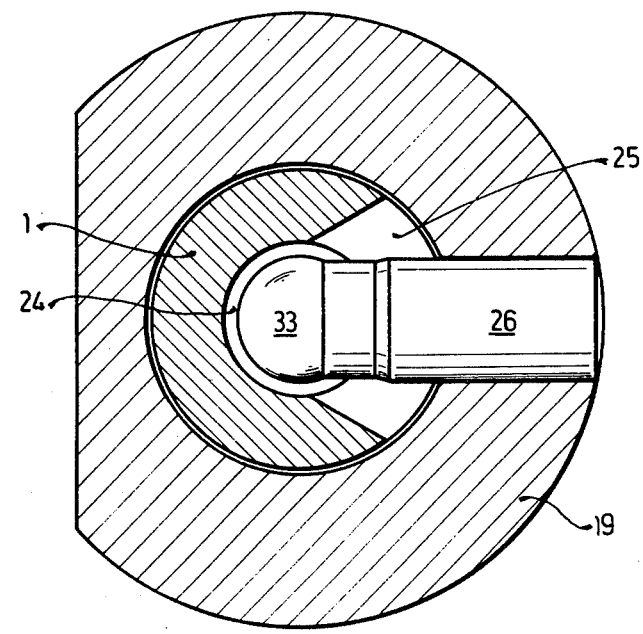
FIG. 4 is a section along the line IV—IV in FIG. 2.

FIG. 4 is a detailed illustration showing the recess 25 in the shaft 1 and the relative pivotal motion of the guide pin 26 permitted thereby. The axial position of the air flow meter 2 on the shaft 1 may also be insured by elements of different configuration than the elements 23 and 24 of FIG. 1. For example, as illustrated in FIG. 6, the guide elements may be in the shape of spheres 76, 77 while the guide pin 78 would be embodied as a cylindrical bolt. A cylindrical bolt 78 could also be used in place of the spherical ended bolt 26 of the embodiment of FIG. 2. In the embodiment of FIG. 6, the guide pin 78 could also have a rectangular cross section.

The pivotal mechanism described above according to the present invention results in a guidance with reduced friction in both radial and axial directions involving the use of relatively inexpensive parts and permitting great facility of installation and adjustment. The fact that the mechanism which adjusts the relative axial position of the air flow meter is located at only one end of the pivotal shaft provides the advantage that the other end face of the pivotal shaft is available for association with other devices, for example hydraulic lines, as described above.

The foregoing relates to merely preferred exemplary embodiments of the invention, it being understood that other embodiments and variants thereof are possible within the spirit and scope of the invention, the latter being defined by the appended claims.

What is claimed and desired to be secured by letters patent of the United States is:

1. A mechanism for holding and axially locating a pivoting member on a shaft, comprising:
   said shaft having a blind axial bore provided with partial internal threads and a radial channel communicating with said blind bore;
   a hub surrounding said shaft coaxially and carrying said pivoting member, said hub having locating means extending through said radial channel into said blind bore in said shaft;
   guide means, disposed on either side of said locating means in said blind bore in said shaft and capable of axial motion therein and disposed to engage and hold said locating means and said hub in a given axial position with respect to said shaft; and
   an externally threaded adjustment screw disposed to engage said internal threads of said blind bore in said shaft and to bear against one of said guide means to thereby limit the excursion thereof in one axial direction of said bore and a spring disposed in said blind bore to bear against to the other of said guide means to limit the axial excursion thereof in the opposite axial direction.

2. A mechanism as defined by claim 1, wherein said guide means is two balls between which said locating means is disposed.

3. A mechanism as defined by claim 2, wherein said locating means is a pin extending from said hub.

4. A mechanism as defined by claim 2 wherein said locating means is a pin having a rectangular cross-sectional profile.

5. A mechanism as defined by claim 1, wherein said guide means is two cylindrical rollers.

6. A mechanism as defined by claim 5, wherein said locating means is a pin extending from said hub.

7. A mechanism as defined by claim 6, wherein the portion of said pin engaged by said guide means is substantially spherical.

8. A mechanism as defined by claim 1, further comprising a threaded nut held on the end of said adjustment screw which extends from said shaft, said nut bearing on the end face of said shaft and having circumferential gear teeth which engage first threads of a worm gear for adjusting and fixing the rotational position of said nut.

9. A mechanism as defined by claim 8, wherein said worm gear is disposed to rotate within a locally fixed member via second screw threads the pitch of which is opposite to and slightly different from the pitch of said first threads which engage said nut.

* * * * *